S. M. VAUCLAIN.
CAR TRUCK.
APPLICATION FILED MAY 4, 1912.
1,102,108.
Patented June 30, 1914.
2 SHEETS—SHEET 1.
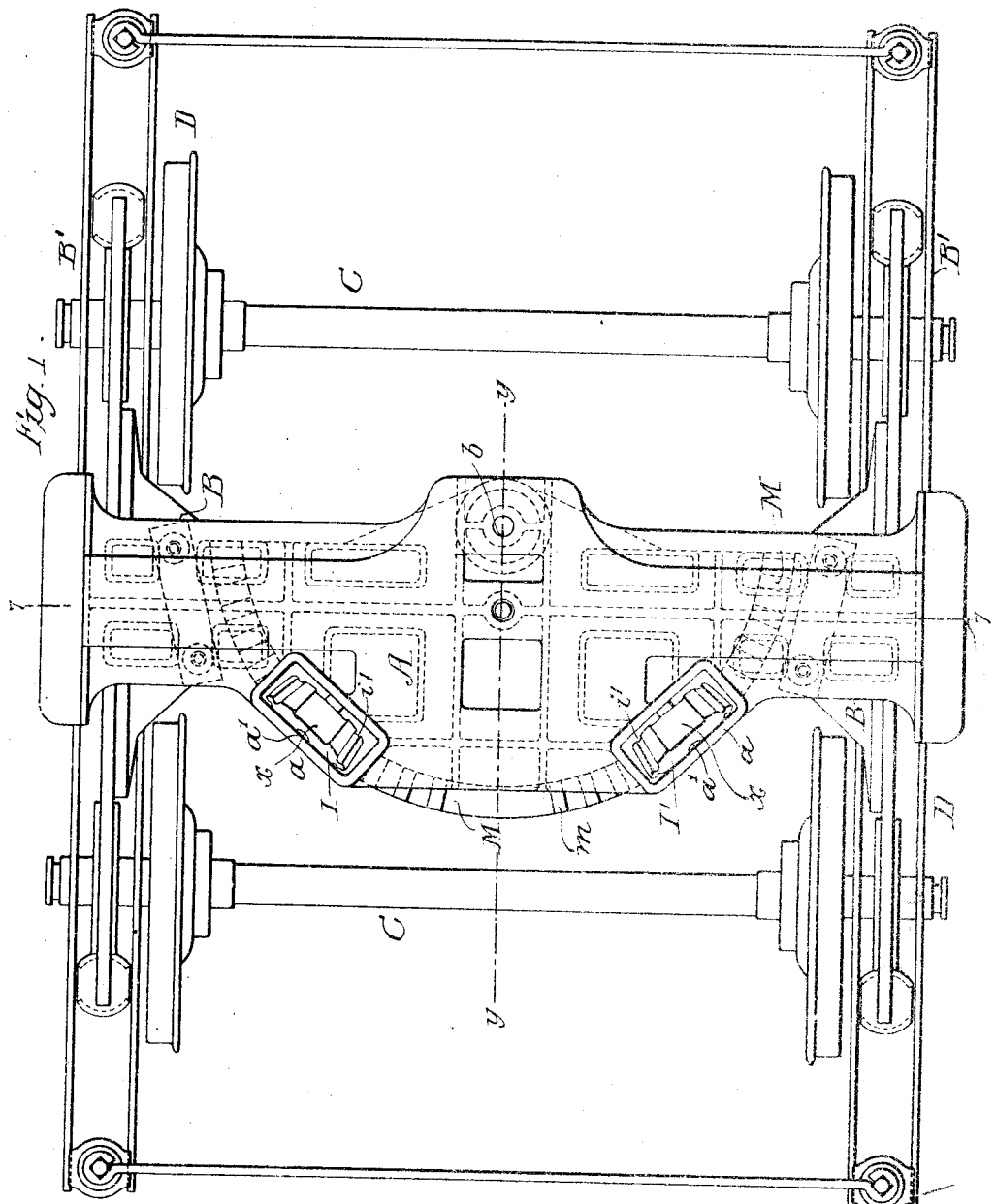
Witnesses—
Walter Chism
Will A. Burrowes
Inventor—
Samuel M. Vauclain
by his Attorneys—
Howson & Howson

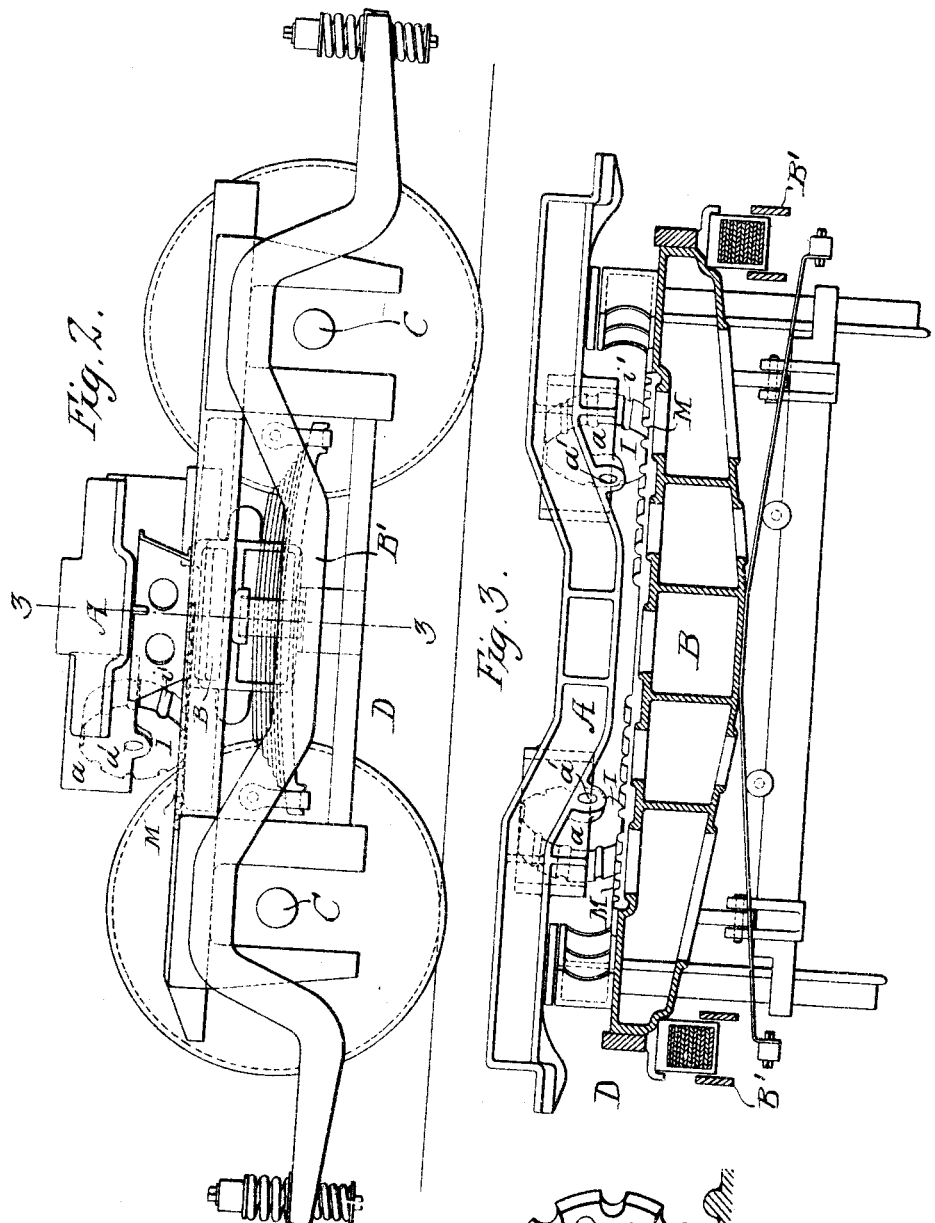

UNITED STATES PATENT OFFICE.

SAMUEL M. VAUCLAIN, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CAR-TRUCK.

1,102,108.

Specification of Letters Patent.  Patented June 30, 1914.

Application filed May 4, 1912. Serial No. 695,106.

*To all whom it may concern:*

Be it known that I, SAMUEL M. VAUCLAIN, a citizen of the United States, residing in Philadelphia, Pennsylvania, have invented certain Improvements in Car-Trucks, of which the following is a specification.

One object of my invention is to provide means for preventing the "nosing" of a car when said car is traveling either on a straight or on a crooked track.

A further object of the invention is to provide means for quickly bringing the truck to its normal position after the car has passed over a curve.

A still further object of the invention is to provide a three point contact on each truck for a car body.

In the accompanying drawings:—Figure 1, is a plan view of a car truck illustrating my invention and showing the body bolster mounted above the truck; Fig. 2, is a side view of the truck; Fig. 3, is a transverse sectional view of the truck on the line 3—3, Fig. 2, showing the body bolster in outside view; and Fig. 4, is an enlarged view showing the wheel and the rack plate detached.

Referring to the drawings, A is the body bolster secured to the car body.

D is the truck frame having a bolster B secured thereto extending from one side frame B' to the other, as illustrated in Fig. 1.

C—C are the axles having the ordinary wheels and mounted in boxes located in the side frames B'. The pivot $b$ of the truck is at one side of the transverse line through the center of the truck and the other two bearings X—X are on the opposite side of said transverse line and on each side of the longitudinal center line $y$—$y$ of the truck so that a three point support for the car body is provided.

Forming part of the truck bolster B or secured thereto is a segmental rack M, having teeth $m$ and mounted in bearings $a$ on the body bolster A are pivot pins $a'$ for the wheels I, which are recessed at $i'$ to mesh with the toothed rack plate M. These wheels are on the line $x$—$x$ and form two of the three bearing points of the car body on the truck. The bearing surface of each wheel is beveled, as shown, from the pivot point $b$ of the truck. Each wheel has an extended flat portion $i$. This flat portion is greater than the distance between the other notches on the wheel. I preferably so arrange the parts that the bearing is taken by the teeth; there being a clearance between the flat surface $i$ of the wheel and the flat surface of the segment M, but in some instances the two flat surfaces may be in contact, if desired.

In this construction, the flat portion $i$ of the wheels I rests directly above the segmental rack M and offers a resistance to any change in the parallelism of the axes of car and trucks; preventing "nosing" or swiveling of the trucks under the car body, due to irregularity of track or other causes. Thus, a car, when traveling rapidly over an uneven track, will ride with comparative smoothness.

The truck must lift the car body in order to allow it to turn, but this lifting will only occur when a car is passing around a curve, at which time the car body will be lifted; the trucks freely swinging under the car body without further elevation of said car body.

I claim:

1. The combination of a car body, a truck pivotally mounted under the car body; the pivot of the truck being at one side of the center of the truck and forming one bearing; a toothed segment on the truck; two notched wheels mounted on the body of the car and bearing upon the segment; said wheels being located on the opposite side of a transverse line through the truck to the center bearing and on opposite sides of the longitudinal center line.

2. The combination in a car body, of a truck pivotally mounted under the car body having a center bearing and two side bearings at each side of the longitudinal center line of the truck and to one side of the transverse center line; said side bearings consisting of a segmental rack on the truck and wheels on the car body; the wheels and the rack having flat portions which are opposite to each other when the longitudinal line of the truck is parallel with the longitudinal line of the car body.

3. The combination of a car body; a bolster secured thereto; a car truck having a bolster extending transversely of the truck; the two bolsters being pivotally connected on the longitudinal center line of the car body and to one side of the transverse line through the center of the truck; a toothed segment on the truck bolster; the body bolster having bearings; pins in the bearings radiating from the pivot connection of the two bolsters; a notched wheel on each pin bearing upon the segment; said wheels having an extended flat surface resting normally above the segment when the center line of the truck is parallel with the center line of the car body; the balance of each wheel being concentric so that while the truck is prevented from "nosing", it is free to turn when the car is passing around a curve without further elevation of the car body.

In testimony whereof, I have signed my name to this specification, in the presence of two subscribing witnesses.

SAMUEL M. VAUCLAIN.

Witnesses:
J. H. KERST,
C. E. ROBINSON.